Figure 1:
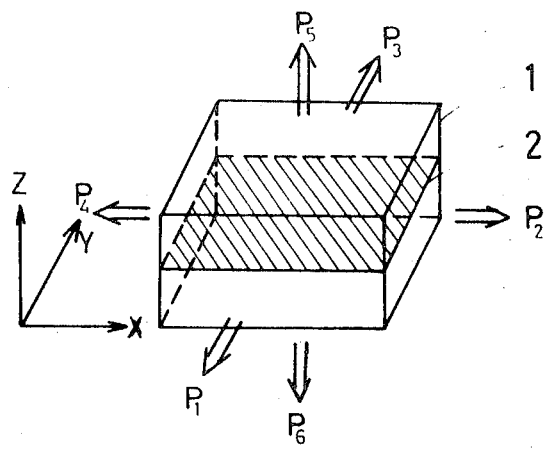

United States Patent

[11] 3,617,131

[72] Inventor Hiromi Taguchi, Tokyo, Japan
[21] Appl. No. 844,398
[22] Filed July 24, 1969
[45] Patented Nov. 2, 1971
[73] Assignee Konishiroku Photo Industry Co., Ltd.
[32] Priorities July 24, 1968
[33] Japan
[31] 43/51820; Dec. 25, 1968, Japan, No. 43/94483

[54] SYSTEM FOR DETECTION OF MINUTE INCLINATION
5 Claims, 16 Drawing Figs.

[52] U.S. Cl. .................................... 356/152, 250/216, 356/149
[51] Int. Cl. .................................... G01b 11/26, G01c 9/06
[50] Field of Search .......................... 356/120, 123, 152, 141, 149; 33/73; 250/201, 203, 216, 231, 234

[56] References Cited
UNITED STATES PATENTS
2,552,890  5/1951  Eisler ............ 250/201
3,011,384  12/1961 Biber ............ 250/216
3,432,671  3/1969  Edmonds ........ 250/216

Primary Examiner—Rodney D. Bennett, Jr.
Assistant Examiner—S. C. Buczinski
Attorneys—Harry C. Bierman, Jordan B. Bierman and Bierman & Bierman ABSTRACT: A system for detecting a minute inclination of an object surface with respect to the horizontal is provided, which comprises a light source and a photoelectric transducer arranged in a predetermined relationship so that a spotlike or slitlike light beam impinges upon different areas of varying sensitivity of the transducer when the object surface on which these elements are mounted includes an inclination with respect to the horizontal. A pendulum is used to provide a vertical reference to the system.

SYSTEM FOR DETECTION OF MINUTE INCLINATION

The invention relates to a leveling system for detecting the inclination of an object or a part thereof with respect to the horizontal, and more particularly to a detection system adapted for measurement of a minute inclination from the horizontal.

The detection of an inclination of an object with respect to the horizontal heretofore involved the use of a spirit or bubble level most commonly, and in certain applications, other optical or electrical systems have been employed as by autocollimation or by incorporating a pendulum which carries a core surrounded by a coil or carries a pair of conductive plates forming an electrical capacitance with stationary opposite plates. However, these prior art techniques failed to provide sufficient accuracy, and an increased accuracy was only possible with units of a large size which is almost prohibitive for their use as portable units. Also the resulting units had not been a lightweight and low power dissipation system. Thus it is apparent that there has been a need for a commercially useful, portable leveling system having a high accuracy.

Therefore, it is an object of the invention to provide an improved system for detection of minute angle of inclination which provides a high accuracy and which is sufficiently compact and of lightweight to permit its use as a portable unit while operating with a reduced power dissipation.

In accordance with the invention, there is provided a system for detection of a minute inclination of an object surface with respect to the horizontal which comprises a light source providing a light beam having a cross section which is of reduced dimension at least in one direction, a photoelectric transducer located at a predetermined position with respect to the light source, said beam being normally directed to a predetermined first area of said photoelectric transducer to form an optical image of the source thereon, said transducer having a second area adjacent said first area, the second area being of different light sensitivity from that of the first area, at least one of the light source and the transducer being physically placed on a surface of the object of which inclination with respect to the horizontal is to be detected, and a pendulum operable to direct said beam to said predetermined first area on the transducer when the surface has no deflection from the horizontal, said pendulum serving to cause a deviation of at least a portion of said beam from said predetermined first area when the surface includes an inclination with respect to the horizontal, whereby an indication of said inclination is obtained from the output of the transducer.

Figure 2:
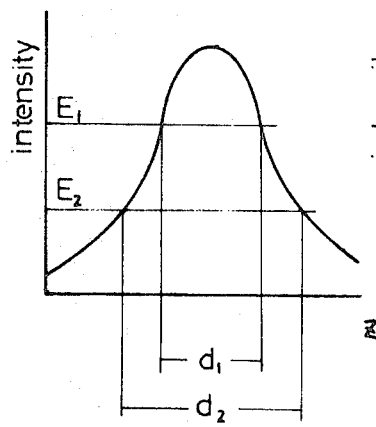
Figure 3:
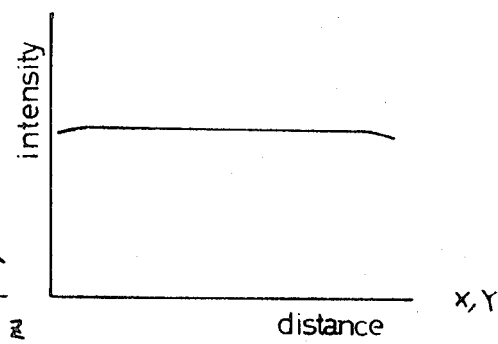
Figure 4:
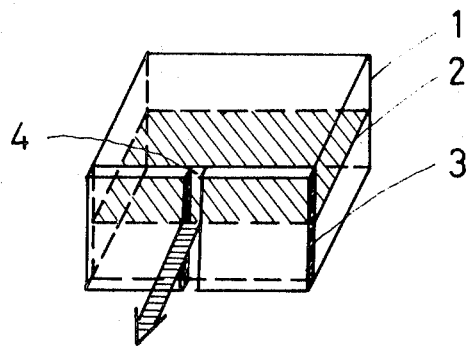
Figure 5:
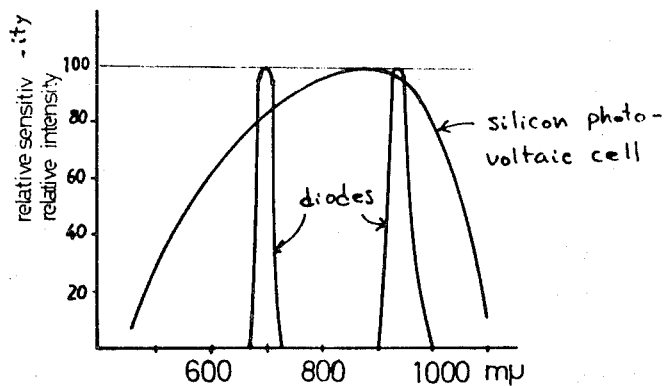
Figure 6:
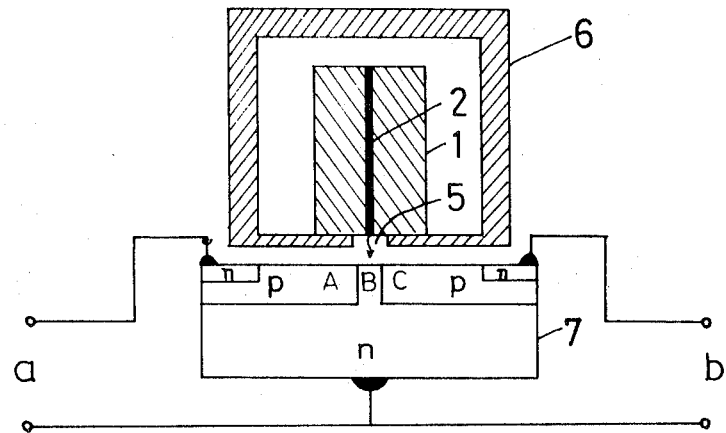

For a better understanding of the invention, the same will be described more particularly with reference to the drawings, in which FIG. 1 illustrates schematically an electroluminescent diode which can advantageously be employed in the system of the invention, FIG. 2 is a graph showing a typical distribution of light output emitted in a direction parallel to X-Y plane or the junction of the diode shown in FIG. 1, plotted against the thickness of the junction, FIG. 3 is a similar graph for light output emitted in the direction of Z-axis or normal to the junction of the diode, plotted against the distance along X- or Y-axis, FIG. 4 shows an electroluminescent diode in combination with a light shield attached to one sidewall thereof, thereby providing a slit-shaped light beam, FIG. 5 shows spectrum response of typical electroluminescent diodes and a silicon photovoltaic cell, FIG. 6 is a view illustrating the principle of the invention and showing an electroluminescent diode in operative cooperation with a double NPN phototransistor schematically.

Figure 7:
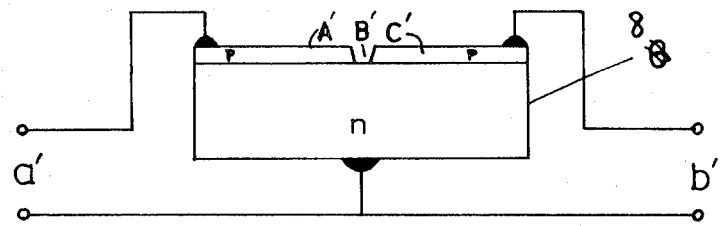
Figure 11:
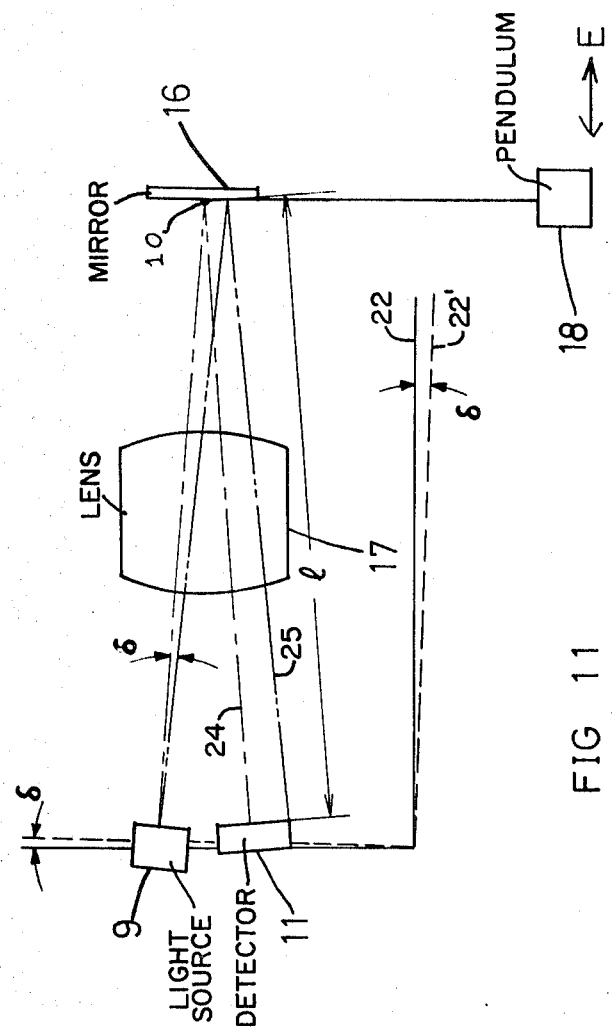
Figure 12:
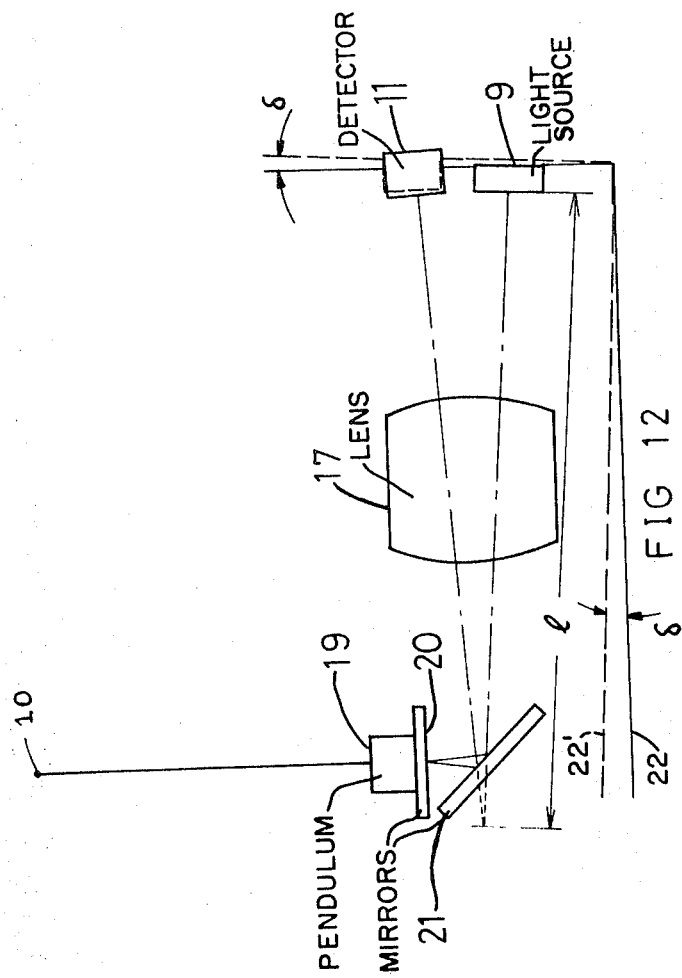
Figure 13:
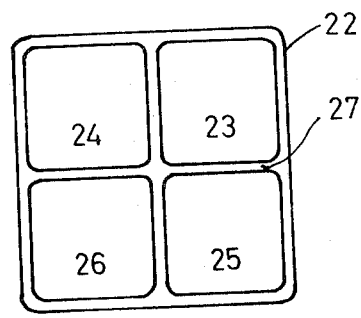
Figure 14:
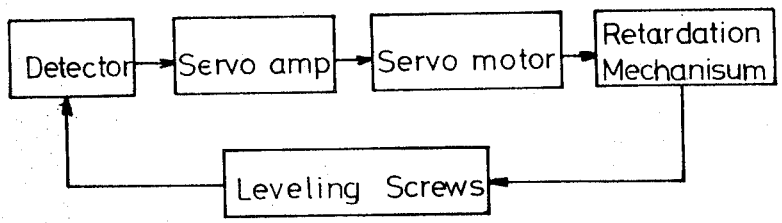
Figure 15:
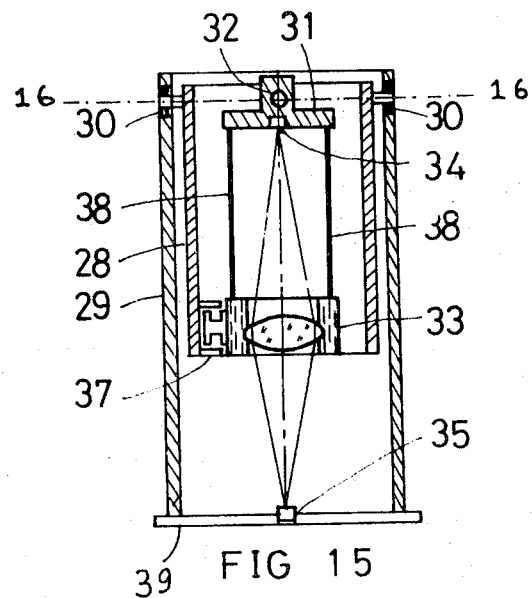
Figure 16:
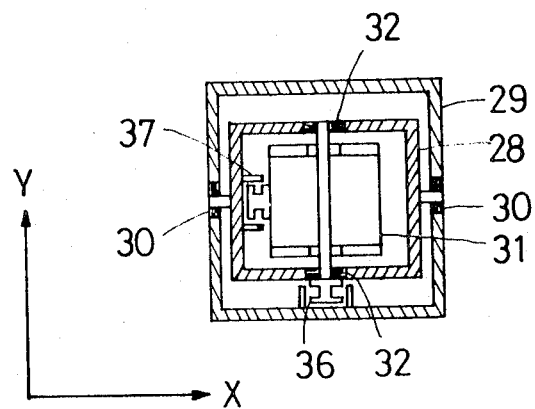

FIG. 7 shows an alternative form of photoelectric transducer or a photodiode which can be used in the invention, FIGS. 8 to 12 shows various embodiments of the invention in schematic form, FIG. 13 is a schematic view showing a preferred form of the photoelectric transducer arrangement, FIG. 14 is a diagram illustrating a servo system in which the invention can be incorporated to provide a leveling system, FIG. 15 shows, in elevational section, a further embodiment of the invention, and FIG. 16 is a cross section taken along the line 16—16 in FIG. 15.

In carrying out the invention, a light source is used which provides a light beam having a cross section which is of reduced dimension at least in one direction; thus the beam cross section may be either slit-shaped or in the form of a spot. Any suitable light source can be used for this purpose. However, because the operability of the invention depends on the shift of the optical image of the light source across a sensitive area of a photoelectric transducer in dependence upon the inclination of a surface on which either element may be supported, the cross-sectional area of the beam should be such that the transducer can properly respond to the light input thereto to provide a distinction in the output thereof between different positions of incidence of light. A preferred light source comprises an electroluminescent diode, which is a semiconductor PN junction element that emits light in the visible region of spectrum or near infrared rays from the surface of the junction when the latter is subjected to current in its forward direction.

FIG. 1 shows a body of such an electroluminescent diode 1 having a junction 2 shown by shade lines. It is believed that the electroluminescence is excited by application of a forward bias (not shown) across the junction to emit light in a direction perpendicular to the direction of current flow and hence in a plane parallel to the junction, but high refractive index of the semiconductor crystal body causes appreciable refraction of primary rays to take place therein with the result that rays emanate from all the faces of the crystal body 1 as shown by arrows $P_1$ to $P_6$ in FIG. 1. Whether or not this be a correct explanation, it is observed that the intensity of light emitted in the direction indicated by arrows $P_1$ to $P_4$, that is, in the direction parallel to the junction, has a distribution as indicated by the curve of FIG. 2, where the abscissa represents the thickness of the junction, or Z-axis shown in FIG. 1. Thus the light intensity is at maximum at the center of the junction, as considered in the direction of its thickness, and decreases on opposite sides of the center. It will be noted that when a photoelectric transducer having the threshold sensitivity of $E_1$ is placed in close contact with one side edge of the boy 1 in alignment with the junction 2, the transducer will sense output light emitted from only that portion of said side edge which is represented by a thickness region $d_1$ in FIG. 2. A more sensitive transducer having the threshold sensitivity of $E_2$ will respond to light from a broader thickness region $d_2$. Although the precise value of such effective region depends on the formation, in particular the thickness, of the diode junction, a typical value for commercially available electroluminescent diodes will be on the order of 20 to 30 microns. This makes contrast to the distribution of light emitted in the direction of arrows $P_5$ and $P_6$, that is, normal to the surface of the junction, which is illustrated in FIG. 3 and exhibits a flat distribution over the X-Y plane. While the prior art utilization of electroluminescent diodes has taken out light output in the direction of arrows $P_5$ and $P_6$ for the principal reason of luminescence efficiency, the invention uses, in its preferred form, light output in one of the directions indicated by arrows $P_1$ to $P_4$ so that the electroluminescent diode can be effectively operated as a very thin line source of light.

FIG. 4 shows electroluminescent diode 1 with a light shield 3 attached to one of its side edges, the shield 3 being in close contact with the associated side edge to prevent divergence of ray. Such shield can be provided by known photographic process. The shield 3 has formed therein a slit 4 which extends in a direction perpendicular to the major surface of the junction 2. Since the effective area of emitting light from the junction is limited in the direction of thickness thereof for the reason mentioned above in connection with FIG. 2, further restriction by the shield 3 in the direction along the side produces a very thin beam of light. The slit 4 may be replaced by a pinhole in the light shield. By choosing the slit width or pinhole diameter to have a value from 20 to 30 microns, for example, it is readily possible to provide a point source of light having a half-value width of 20 to 30 microns.

The advantage of using such an electroluminescent diode to provide a point or line source of light over the use of a more conventional lamp will be appreciated from the following comparison: A comparison of radiation output per unit area under the same power dissipation was made using commercially available electroluminescent diodes with an input of 1.2 volts and 50 m. and a tungsten lamp with the rating of 6 volts and 0.15 a. A silicon photovoltaic cell having the sensitivity characteristic shown in FIG. 5 was used for detection of radiation output. This figure also shows the luminescence spectra of two different kinds of electroluminescent diodes. The area of radiation was calculated by taking the half-value width multiplied by the width of the slit opening for the diode and taking the surface area of the filament for the tungsten lamp, as viewed in a direction normal to the plane defined by the filament. The measurement conducted showed that with power dissipation of 100 mw., the diode had a radiation output per unit area which is in excess of that of the tungsten lamp by about 50 percent. Thus it is seen that an electroluminescent diode is more efficient than a tungsten lamp when operating as a point or line source of beam size mentioned above. A more predominant advantage afforded by forming a point or line source of light with an electroluminescent diode is the fact that an extremely small size of the light source is permitted. In one example, a light source is formed in a holder or casing of 5×5×5 mm. If a tungsten lamp is used to provide a light source of equivalent capability, the resulting unit could not be reduced in size below 10 mm. ×40 mm. In addition, a diode light source is insensitive to vibrations and shocks.

However, above comparison should not be construed as limiting the invention to the use of an electroluminescent diode as a light source. Thus, while a conventional light source such as tungsten lamp will have an increased size and power dissipation as compared with a diode light source, it is possible to construct a point source of light with tungsten lamp, for example, by incorporating in the light shield casing a light shield with a pinhole therein and by arranging such that the image of the tungsten filament is focused adjacent the pinhole. Such assembly could be made a rigid construction adapted for portable use. Therefore, it should be understood that the invention is operable with a light source other than an electroluminescent diode, although in the following description such electroluminescent diode is used as a preferred light source.

Referring to FIG. 6, this figure illustrates the principle of the invention as applied to the detection of an inclination in only one direction just as a bubble level is used for such purpose. In FIG. 6, an electroluminescent diode 1 having a junction 2 is firmly secured by suitable means on the bottom wall of an enclosure 6 with one edge of the diode exposed in an opening or slit 5 formed in the bottom wall. While not shown, it should be understood that an external circuit is connected across the diode to have a forward current flow. As will be noted, the diode is disposed so that the junction 2 extends in a direction normal to the bottom wall, and in this instance the diode 1 acts as a line source of light. The slit width is chosen substantially greater than the effective width of the line source in the sense of the effective intensity of radiation above the sensitivity level of an associated photoelectric transducer, which in the present example is constituted by a phototransistor 7. The detector 7 comprises a common substrate of N-conductivity type semiconductor material into which acceptor impurities are diffused to form a pair of spaced P-type regions, separated by the substrate material as shown at B. Into these P-type regions are diffused donor impurities to form a pair of N-type regions therein. As shown, both P-type regions are partly exposed at A and C on opposite sides of the region B. To the top N-type regions are attached contacts from which lead wires extend to separate terminals, which form, together with terminals connected with the contact to the common substrate, pairs $a$ and $b$. In use, the both terminals $a$ and $b$ are connected across voltage sources in series with resistors, and preferably the junctions between the voltage sources and the resistors are interconnected through a galvanometer. The arrangement is such that when light emitted from the junction in a direction parallel to the plane thereof is directed to the region B, there is no current flow across the both pairs of terminals $a$ and $b$. However, when such light is directed to either region A or C as by tilting of the enclosure 6 or the detector 7, there is a corresponding current flow in the circuit connected across terminals $a$ or terminals $b$, respectively. Thus it will be understood that when the enclosure 6 is positioned so as to bring the slit 5 into alignment with the region B and is held as by suspension on a pendulum so as to dispose the junction 2 in the vertical, any deflection of the phototransistor body from the horizontal can be detected and converted into a corresponding current flow in the circuit across either terminals $a$ or $b$. The region B represents an insensitive region, which is chosen to have a width on the order of 20 to 30 microns.

FIG. 7 shows a silicon compound PN junction detector 8 similar in function to the phototransistor 7 shown in FIG. 6. This detector 8 comprises a pair of P-type layers A' and C' on an N-type substrate, the layers A' and C' being separated by a spacing B' therebetween. The use and operation of this detector are similar to those of the phototransistor 7 mentioned above.

Figure 8:
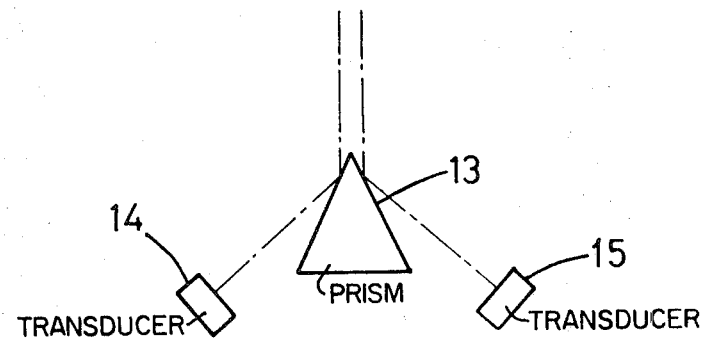

FIGS. 8 to 12 shows various embodiments of the invention in a schematic manner. In FIG. 8, a detector is constituted by an optical prism 13 and a pair of photoelectric transducers 14 and 15. An optical system (not shown) is used to focus the image of a linear source of light as depicted in FIG. 6 and placed directly above the prism 13 at the apex thereof. Conveniently the source is carried on a pendulum which is formed by a hollow cylinder in which the optical system is housed and the pendulum is provided with a pivot at its top, the pivot being rotatably mounted on an object of which inclination with respect to the horizontal is to be detected. The detector including the prism 13 and transducers 14, 15 is made a compact assembly which can be on the order of 25 mm. square by 10 to 15 mm. in height. The assembly is placed on the object. Such system allows precise detection of the inclination which the object may include with respect to the horizontal. Both the hollow pendulum and the detector assembly can be housed in a casing as shown in FIGS. 15 and 16, and in this instance, it is only necessary to place the casing on the object. With the arrangement of FIG. 8, the elements 14 and 15 need not be a phototransistor or a silicon cell shown in FIG. 6 or FIG. 7, but more conventional photoelectric transducers can be used.

Figures 9, 10:
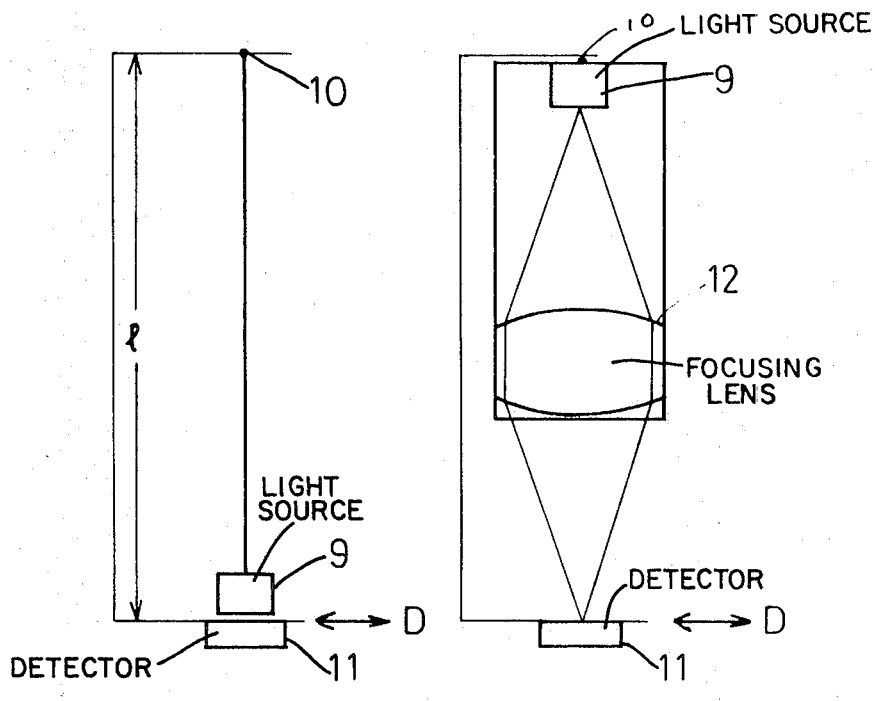

In FIG. 9, the system comprises a linear light source 9, formed by an electroluminescent diode, carried at the free end of a pendulum that is pivoted at 10 to the object. The pendulum is swingable in the direction of a both-ended arrow D. The system also includes a detector 11 constituted by a phototransistor shown in FIG. 6 or by a silicon photovoltaic cell shown in FIG. 7. The detector 11 is positioned on the object opposite to the source. In use, it will be appreciated that assuming an angle of inclination of $\delta$ for the surface on which the transducer 11 is placed, the optical image of the linear source formed on the surface of the transducer will move or traverse thereacross a distance of $l \tan \delta$, where $l$ denotes the distance from the pivot of the pendulum to the surface of the transducer. Such displacement of the image is sufficient to shift it from the central neutral or insensitive region B or B' to either side sensitive region A, C or A', C' (see FIGS. 6 and 7). A differential output from the terminals $a$ and $b$ can be amplified to operate a servo motor which drives leveling screws used to support the object, thereby removing any detectable inclination thereof from the horizontal (FIG. 14).

FIG. 10 shows a variation of FIG. 9 in that a pendulum is constituted by a hollow cylinder containing in the interior thereof a linear or point source 9 at its top and a focusing lens 12 at its bottom. The pendulum is pivoted to the object at 10.

The operation is similar as in FIG. 9, but an improved accuracy is obtained in this system in that it removes a certain divergence of light which inevitably occurs in the arrangement of FIG. 9. When the aforementioned servo mechanism (refer FIG. 14) was used to achieve an automatic leveling of a measuring instrument in one direction, a good reproducibility was obtained with accuracy within ±2seconds. This is compared to the accuracy on the order of 30 to 40 seconds which is usually obtained with a bubble level and leveling screw arrangement.

While the light source 9 has been shown in FIGS. 9 and 10 as secured to the pendulum, it will be understood that the mounting position of the light source 9 and the detector 11 may be interchanged without any loss of sensitivity. Also the systems schematically illustrated in these figures can be incorporated into a compact integral casing for convenience of use on the field, as previously mentioned in connection with FIG. 8.

Another manner of carrying out the invention is illustrated in FIGS. 11 and 12. These embodiments are characterized by the provision of a mirror secured to a pendulum for integral movement therewith. In either arrangement, the pendulum is pivoted at 10 for swingable movement in a vertical plane (indicated by a both-ended arrow E). In FIG. 11, a light beam emitted by the linear light source 9 is focused by a lens 17 onto a mirror 16 that is secured to the pendulum 18 at the pivot 10 thereof. The reflected light from the mirror 16 is detected by a detector 11. The whole assembly is placed in relative to the horizontal surface 22 of an object, and when the object includes an angle of inclination, δ, from the true horizontal, the position of the image formed on the detector 11 of the light source will move a distance of $2\,l\,\tan\delta$, where $l$ is the distance between the elements 9, 11 and the mirror 16, both elements 9 and 11 assumed to be at the same distance from the mirror 16. The image shift on the detector 11 is indicated by lines 24 and 25 in which 24 is the beam in the nominal horizontal condition and 25 represents the image shift occasioned by the nonhorizontal surface 22'. However, they may be located at different positions. FIG. 12 represents a variation of FIG. 11 in that the vertical mirror 16 of FIG. 11 is replaced by a horizontal mirror 20 that is secured to the free en of the pendulum and additionally an inclined mirror 21 is disposed in the path of light between the lens 17 and mirror 20. The choice of either arrangement depends upon particular applications, even though in the FIG. 12 arrangement, a larger angle of deflection causes a change in the length of the part of light. The primary advantage of the pendulum-mirror system is an increased sensitivity afforded by the fact that in FIG. 11 it doubles the effect of inclination.

FIG. 13 shows that the sensitive surface of a phototransistor or silicon photovoltaic cell 22 can be divided into four areas 23, 24, 25, and 26 separated from each other by cruciform insensitive areas 27 (20 to 30 microns in width). Outputs from these four areas are separately connected to external circuits (not shown) to provide an indication of inclination of an examined object surface in tow orthogonal directions. This is achieved by using a point source of light as shown in FIG. 4 and by determining the disposition of the point source relative to the transducer so that in the absence of the influence of inclination of the object surface, the light beam from the source, having a spotlike cross section, impinges upon the crossover of the insensitive areas 17. When either the source or the transducer is subject to the influence of inclination of the object surface, the relative disposition varies, the beam strikes one of the areas 23 to 26 more heavily than others, so that the resulting unbalance between the outputs of different sensitive areas provides an indication in which direction the object surface inclines predominantly.

FIGS. 15 and 16 show a still further embodiment of the invention which incorporates the transducer 22 of FIG. 13 in conjunction with a point source of light as shown in FIG. 4. The system shown comprises an open-ended rectangular frame 28 and an outer similar frame 29, the inner frame 28 being rotatably supported by the outer frame 29 at the top edge thereof as by roller bearings 30. A support member 31 is also rotatably supported by the inner frame 28 as by roller bearings 32, and as will be seen in FIG. 16, pivots associated with these bearings 30, 32 extend at right angles to each other. Thus the frame 28 is swingable in the direction of Y-axis shown in FIG. 16, while the support member 31 is swingable in the direction of X-axis. The support member 31 has formed in its bottom surface with a recess in which is securely received a point source of light 34, the source 34 being the one shown in FIG. 4 with its light-emitting side directed downward, as viewed in FIG. 15. A lens unit 33 is suspended from the support member 31 by threads or wires 38. The suspension means 38 may replaced by connecting rods, plates or other rigid members. Dampers 36, 37 are provided between the outer and inner frames 29, 28 and between the inner frame 28 and the lens unit 33. The outer frame 29 is placed on a baseplate 39 to extend upright therefrom and secured thereto by suitable means, not shown. A photoelectric transducer 35 having the form shown in FIG. 13 is fixed on the baseplate 39. The elements 33, 34 and 35 are aligned with the optical axis of the lens in the unit 33 when the assembly is placed on a precisely horizontal surface.

Such aligning adjustment or calibration of the assembly can be effected by using suitable techniques which satisfy the required sensitivity of the leveling assembly constructed. For example, a pendulum carrying a mirror may be used in combination with autocollimation system to leveling a chosen surface plate on which the assembly is to be mounted, to the required accuracy. Alternatively, high-precision bubble levels having a relatively large radius of curvature at their tube ends may be used in a chamber which is maintained at a constant temperature and free from vibration and moisture. Bubble levels having a minimum scale of a few seconds or less are available and can be useful for such purpose.

The assembly is mounted on such leveled surface plate and the aligning operation completed. Once calibrated, the assembly is subsequently ready to detecting the inclination of any examined surface without further adjustment. The assembly is then sealed in an enclosure.

In one example, the assembly had a size of 60×40×40 mm. with the distance of 50 mm. from the bearing 32 of the pendulum or support member 31 to the transducer surface 35. The beam emitted had a cross section of 30 microns in diameter, and the width of the insensitive areas 27 in FIG. 13 was 40 microns. A leveling operation was conducted with this assembly in the scheme depicted in FIG. 14 to reduce the inclination with the horizontal from ±30 min. to well within ±5 sec. The time length required for this leveling operation was about 10 seconds.

Thus it will be seen that the invention has provided a compact, portable, high-sensitivity and low power dissipation system for detecting inclination of an examined surface either in one or two directions. In addition, the leveling operation can be greatly facilitated by the use of the invention.

While the invention has been described with reference to particular embodiments thereof, it should be apparent that various modifications are possible within the scope of the invention. Thus the transducer may have three sensitive areas, rather than four as shown in FIG. 13, separated by insensitive areas for use with three-point supporting mechanisms. The system according to the invention can also be applied where laser level, transit and theodolite have heretofore been used, with improvement in the sensitivity and the required leveling time period.

Having described the invention, what is claimed is:

1. A system for detection of a minute inclination of an object surface with respect to the horizontal comprising a light source providing a light beam having a cross section which is of reduced dimension at least in one direction, a photoelectric transducer located at a predetermined position with respect to the light source, said beam being normally directed to a predetermined first area of said photoelectric transducer to form an optical image of the source thereon, said transducer having a second area adjacent said first area, the second area being of different light sensitivity from that of the first area, at least either the light source or the transducer being physically placed on a surface of the object of which inclination with respect to the horizontal is to be detected, and a pendulum operable to direct said beam to said predetermined first area on the transducer when said surface has no deflection from the horizontal, said pendulum serving to cause a deviation of at least a portion of said beam from said predetermined first area when the surface includes an inclination with respect to the horizontal, whereby an indication of said inclination is obtained from the output of the transducer.

2. A system for detection of a minute inclination according to claim 1 in which said light source comprises an electroluminescent diode which is forwardly biased in use, and said beam is derived from an edge of the junction of the diode in a direction generally parallel to the major plane of the junction.

3. A system of detection of a minute inclination according to claim 1, in which said photoelectric transducer comprises a semiconductor PN junction element responsive to a light input thereto for providing an electrical output signal.

4. A system for detection of a minute inclination according to claim 1, further including an optical system between the light source and the photoelectric transducer.

5. A system for detection of a minute inclination according to claim 3 in which the semiconductor element has a plurality of sensitive areas separated by insensitive areas therebetween.

* * * * *